Aug. 16, 1960     T. W. MERRITT ET AL     2,949,276
VALVE
Filed June 25, 1959     3 Sheets-Sheet 1
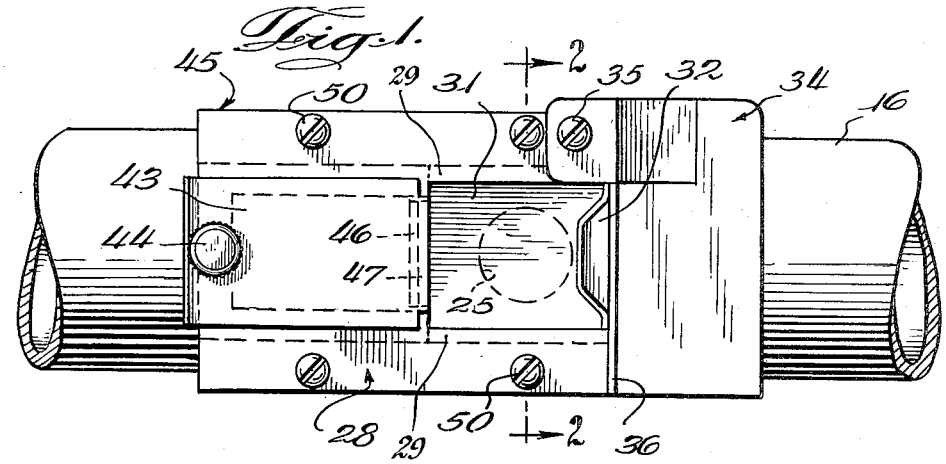
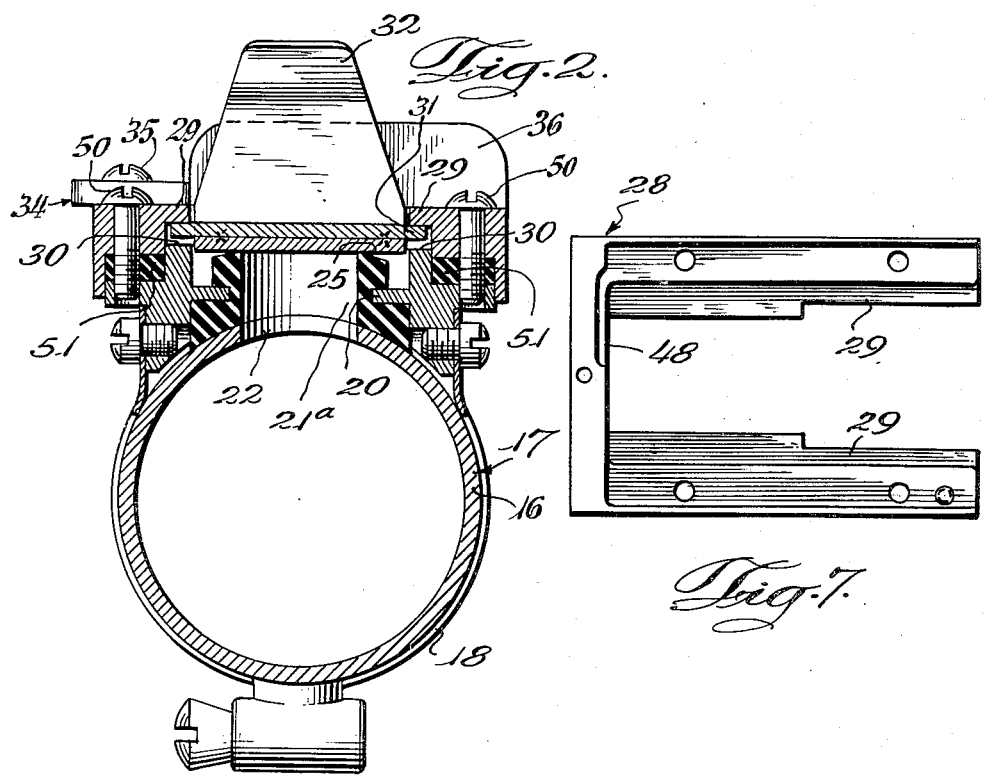
Inventors
Thomas W. Merritt
Chester A. Thomas
By Hofgren, Brady, Wegner, Allen & Stellman
Attorneys Aug. 16, 1960     T. W. MERRITT ET AL     2,949,276
VALVE
Filed June 25, 1959
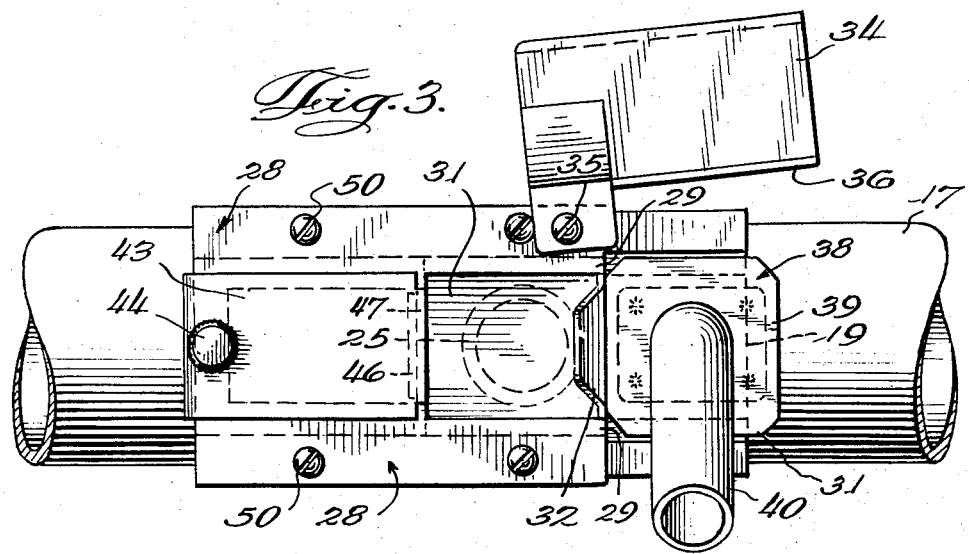
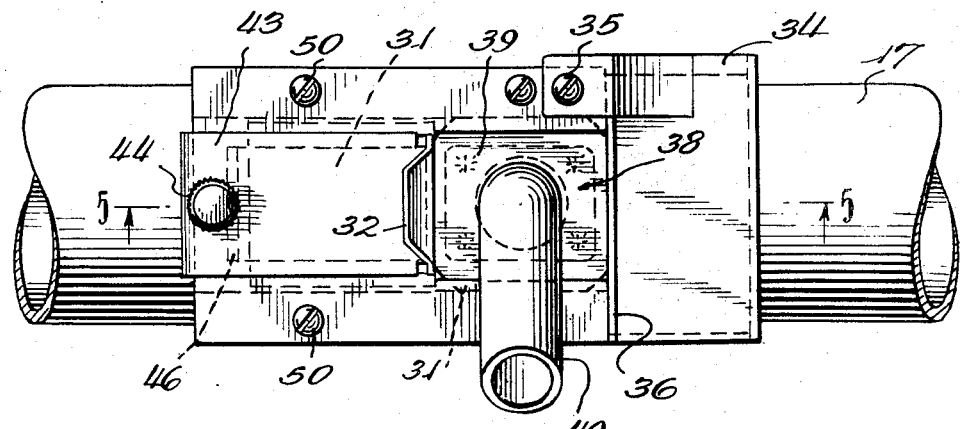

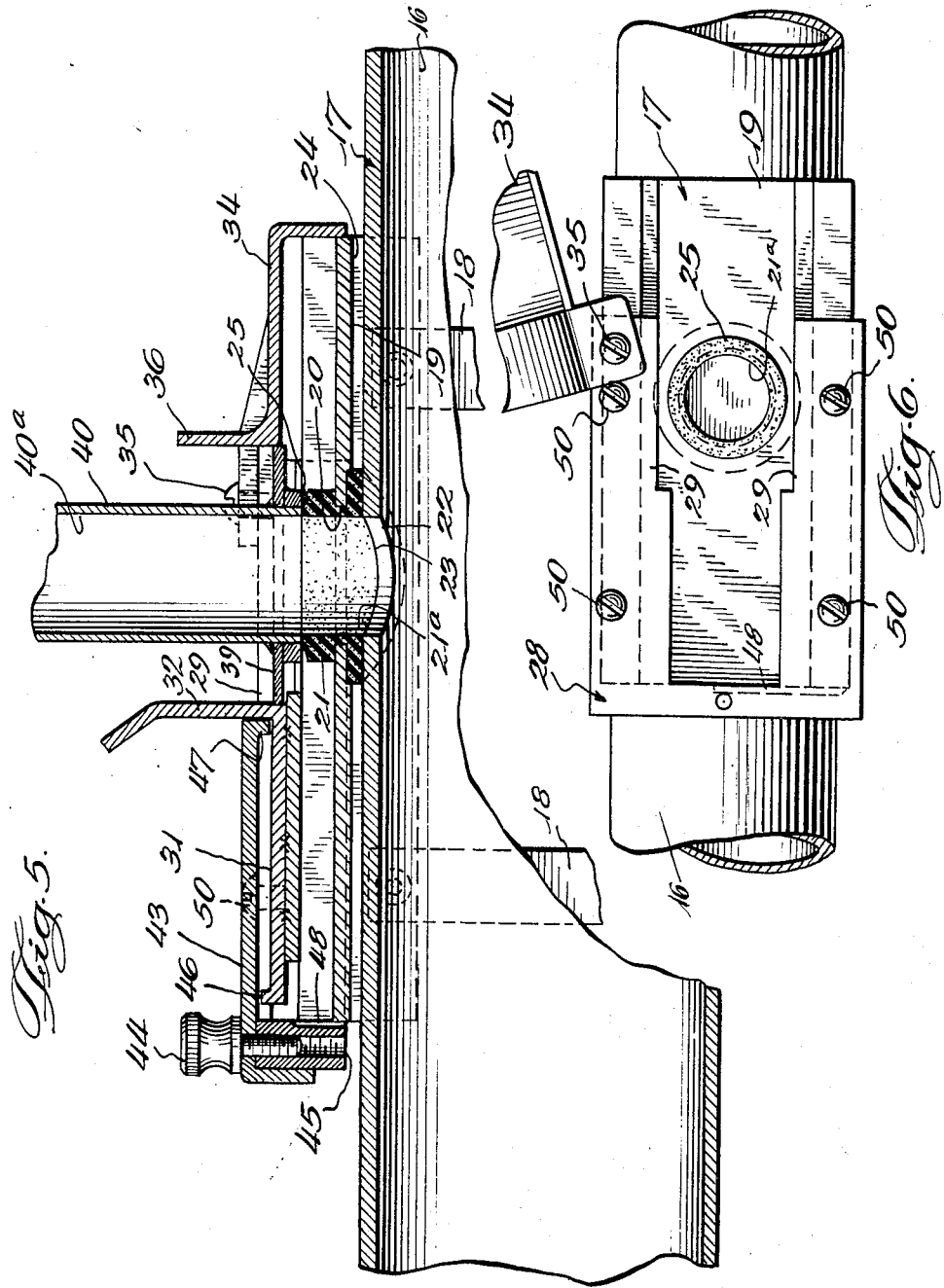

United States Patent Office 2,949,276
Patented Aug. 16, 1960

2,949,276

VALVE

Thomas W. Merritt, St. Charles, and Chester A. Thomas, Lake Forest, Ill., assignors to Babson Bros. Co., a corporation of Illinois Filed June 25, 1959, Ser. No. 822,875

10 Claims. (Cl. 251—146)

This invention relates to a milk pipeline valve and more particularly to a stall cock for connecting a milk withdrawing apparatus with a carry-away milk pipeline.

In a pipeline milking system, the milk from the milk withdrawing apparatus is directed to a pipeline, as through a rubber hose or the like. In a stanchion barn, installation of the milk pipeline is located along the front and above the stalls and a valve is usually provided for every other stall. As the operator moves the milking apparatus from cow to cow the milk hose must be connected with the valve and the valve opened and closed. To facilitate "in place" cleaning the pipeline, the valve must be so arranged that all milk contacted surfaces are thoroughly washed by a flow of washing solution through the pipeline and milk contacted surfaces must be protected from contamination during the milking operation. The valve disclosed herein is an improvement over the valves shown and described in copending Merritt and Thomas application, Serial No. 704,430, filed December 23, 1957, and Babson application, Serial No. 747,870 filed July 11, 1958, both assigned to the assignee of this application.

One feature of the invention is the provision of a base member for the milk pipe-line valve extending longitudinally along the pipeline and having a solid wall portion adjacent the pipeline with rail guide means thereon and a valve closure plate slidable in the rail guides and protected by the solid wall portion when removed from the valve seat. The rail guide means are closed at one end and the closure plate slides into the closed end for complete protection.

Another feature is that a cover is pivoted to the base for movement in the plane thereof, closing the open end of the rail guides. A further feature is the provision of a removable cover plate secured to the base and overlying the rail guides, covering the valve closure plate when in the valve open position. Yet another feature is that the rail guide comprises a U-shaped element adjustably mounted on the base with a resilient cushion therebetween.

Yet a further feature is the provision of means defining a drain opening between the base member and the rail guide. This permits the valve surfaces to be scrubbed with a brush, without trapping water in the valve structure.

Further features and advantages of the invention will readily be apparent from the following specification and from the drawings in which:

Fig. 1 is an elevational view of a valve embodying the invention, shown in closed position and mounted on a pipeline section;

Fig. 2 is a section taken generally along line 2—2 of Fig. 1;

Fig. 3 is an elevation illustrating the attachment of a connector to the valve;

Fig. 4 is an elevation of the valve with the connector in valve open position;

Fig. 5 is a section taken generally along line 5—5 of Fig. 4;

Fig. 6 is an elevation of the valve with the closure and cover plates removed and the cover swung to open position, exposing the interior of the valve base; and Fig. 7 is a bottom view of the rail guide member.

A major problem in the operation of a dairy farm is that of maintaining the milk handling equipment in a clean, sanitary condition. Where bucket milkers are used, the buckets and associated apparatus are normally completely disassembled and scrubbed by hand following use. In recent years, many dairy men have installed carry-away milk pipeline systems in which the milk is withdrawn from the animal and transferred, either directly or through an intermediate milk collection or weighing container, to a pipeline through which it flows to a central collection point as a bulk milk tank. With the early pipeline systems, it was required that the sections of the pipeline and the associated apparatus be completely disassembled and scrubbed by hand. However, recent developments in pipeline construction and in washing apparatus and methods have made it practical to wash carry-away pipelines and much of the milk handling equipment merely by circulating washing and sanitizing solutions through them either under pump pressure or by vacuum.

One major point of difficulty with "in place" cleaning has been the valve or stall cock through which the milk is admitted to the pipeline. Valves have joints, crevices and sealing surfaces into which the milk gets and from which it is difficult to remove without completely disassembling the parts and scrubbing them individually. The problem is particularly acute in a stanchion barn installation having valves generally located at every other stall and in which there may be many valves in the system. The valve disclosed herein incorporates certain improvements in construction and operation over the valves disclosed in the aforementioned copending applications.

Referring now to the drawings, a valve assembly indicated generally at 15 is shown mounted on a pipeline section 16, preferably of stainless steel. The valve base member 17 is secured to the pipeline by adjustable strap 18 and has an intermediate solid plate portion 19 provided with and opening 20 which receives a resilient sealing member 21. The bore 21a of sealing member 21 is in alignment with an opening 22 in the pipeline, and preferably the bore and opening have the same diameter insuring the smooth joint between them at 23. The under surface 24 of the valve base member is curved to conform with the configuration of the surface of pipeline 17 and spaced slightly therefrom. A U-shaped member 28 is mounted on base 17 and has inwardly extending flange surfaces 29 which overlie and form a rail guide with upper edge surfaces 30 of the base member. The outer surface of resilient member 21 is chamfered and serves as a valve seat. A closure plate 31 having an outwardly extending operating portion 32 is slidably received in the channel defined by guide surfaces 29 and 30, and the under surface of the closure plate seats on and seals against the valve seat surface 25 of resilient fitting 21.

A cover 34 is mounted on an end of a leg of U-shaped guide member 28 and pivots about mounting screw 35 in the plane of base member 17 exposing the open end of the channels. The cover is provided with an upstanding surface 36 to facilitate moving it to the open position.

A connector fitting 38 includes a plate 39 similar in size and shape to closure plate 31 and a nipple 40 which extends outwardly and downwardly therefrom for the attachment of a milk hose (not shown). Briefly, the valve is used in the following manner. Connector 38, while connected with the milk hose, is placed in the open end of base member 17, the cover 34 being in its raised position (this may be accomplished by pushing it upwardly with the connector itself). Connector 38 is then moved to the left, as viewed in the drawings, forcing closure 31 off valve seat 25 and bringing the under surface of connector plate 37 into sealed engagement with the valve seat and with the bore 40a of nipple 40 in alignment with the bore 21a of fitting 21. Movement of the parts in the opposite direction, i.e., to the right as viewed in the drawings, permits removal of the connector and brings the closure plate back over the valve seat.

A cover plate 43 is removably secured over guide member 28, to the left of valve seat 21 by thumb screw 44 threaded into the base portion of the U-shaped guide member. A flange 45 extending from the base portion of the U-shaped guide member extends across the end of valve base 17 and together with cover plate 43 completely encloses the end of the valve assembly within which closure plate 31 moves. An upturned lip 46 at the end of closure plate 31 engages downturned lip 47 when the closure plate moves toward the right, properly positioning it over the valve seat. When the connector 38 is inserted and the valve opened, the upstanding portion 32 of the closure plate engages the end of cover plate 43 positioning the bore 40a of nipple 40 in alignment with the passage through the valve seat member 21. Cover plate 43 may be removed by loosening thumbscrew 44 permitting closure plate 31 to slide to the right out of the rail guides.

With the closure and cover plates 31 and 43 removed, the interior of body member 17, the guide channels and the surface of valve seat 25 may be washed as by scrubbing with a brush. A portion 48 of the inner surface of flange 45 at the base of U-shaped guide member 28 is relieved forming a drain opening through which washing solution or moisture left in the body member drains.

The valve has only two sealing surfaces one between the wall of the pipe 17 and resilient sealing member 21, and the other between the sealing member and closure plate 31 or connector plate 38. The wiping action between the closure and connector plates and the sealing member upon opening and closing the valve tends to wipe all of the milk from the milk contacted surfaces. Closure plate 31 is completely enclosed by valve base 17, and portion 45 of the rail guide and cover plate 43, when in the open position, preventing contamination from insects or dirt. The valve can be satisfactorily cleaned in place washing following each use and periodic scrubbing of the interior surfaces.

A tight seal between the closure and connector plates 31 and 38 can be assured by varying the position of guide rails 29 relative to base member 17. The guide rail element is secured to the base by screws 50 and resilient strips 51 are interposed between the rails and the base member, permitting adjustment of the rail spacing.

While I have shown and described certain embodiments of my invention, it is to be understood that it is capable of many modifications. Changes, therefore, in the construction and arrangement may be made without departing from the spirit and scope of the invention as disclosed in the appended claims.

We claim:

1. In a milk pipeline valve: a base mounted on and extending along said pipeline and having a solid wall portion; a valve seat communicating with said pipeline and extending through the wall portion of said base; rail guide means on said base, open at one end and closed at the other; a valve closure plate slidable in said rail guide means inside said closed end; a cover pivoted over the open end of said rail guide means; and a connector element insertable and removable through said open end of said guide means and slidable therein.

2. In a milk pipeline valve: a base mounted on and extending along said pipeline and having a solid wall portion; a valve seat communicating with said pipeline and extending through the wall portion of said base; rail guide means on said base open at one end and closed at the other; a valve closure plate slidable in said rail guide means inside said closed end; a cover pivoted over the open end of said rail guide means for movement in the plane of said base.

3. The valve of claim 2 including an outwardly extending manually engageable surface on said cover.

4. In a milk pipeline valve: a base mounted on and extending along said pipeline and having a solid wall portion; a valve seat communicating with said pipeline and extending through the wall portion of said base; rail guide means on said base open at one end and closed at the other; a valve closure plate slidable in said rail guide means inside said closed end; a cover plate over said valve closure plate; a cover pivoted over the open end of said rail guide means; and a connector element insertable and removable through said open end of said guide means and slidable therein.

5. In a milk pipeline valve: a base mounted on and extending along said pipeline and having a solid wall portion; a valve seat communicating with said pipeline and extending through the wall portion of said base; rail guide means on said base open at one end and closed at the other; a valve closure plate slidable in said rail guide means inside said closed end; a cover plate over said valve closure plate; interengaging surfaces on said valve closure and cover plates limiting movement of the valve closure plate; and a connector element insertable and removable through the open end of said guide means and slidable therein.

6. In a milk pipeline valve: a base mounted on and extending along said pipeline and having a solid wall portion; a valve seat communicating with said pipeline and extending through the wall portion of said base; rail guide means on said base open at one end and closed at the other; a resilient cushion between said base and rail guide means; adjustable retaining means for said rail guide means; a valve closure plate slidable in said rail guide means inside said closed end; and a connector element insertable and removable through said open end of said guide means and slidable therein.

7. In a milk pipeline valve: a base mounted on and extending along said pipeline and having a solid wall portion; a valve seat communicating with said pipeline and extending through the wall portion of said base; rail guide means on said base open at one end and closed at the other; a valve closure plate slidable in said rail guide means inside said closed end; a connector element insertable and removable through said open end of said guide means and slidable therein; and means defining a drain opening between said base and said rail guide means.

8. The valve of claim 7 wherein said rail guide means is a U-shaped member having a portion closing an end of said base, said portion having a relieved surface defining said drain opening.

9. In a milk pipeline valve: a base mounted on and extending along said pipeline and having a solid intermediate wall portion adjacent the pipeline surface with raised edge portions extending longitudinally of the pipeline; a valve seat communicating with said pipeline and extending through the intermediate wall portion of said base between said raised edge portions; a U-shaped rail guide member mounted on said base and defining guide means with the raised edge portions thereof, said member having a depending flange closing an end of said base; a valve closure plate slidable in said rail guide means; a cover plate secured to said rail guide member and overlying said closure plate, said plates having interengaging surfaces limiting the movement of the valve closure plate; a cover pivoted to said rail guide member over the open end of said base, for movement in the plane of said base; and a connector element insertable and removable through said open end of said guide means and slidable therein.

10. The valve of claim 9 wherein surfaces are provided defining a drain opening.

References Cited in the file of this patent

UNITED STATES PATENTS

| | | |
|---|---|---|
| 697,358 | Penner | Apr. 8, 1902 |
| 1,183,343 | Chalupa | May 16, 1916 |
| 1,487,593 | Patton | Mar. 18, 1924 |
| 2,146,336 | Frey | Feb. 7, 1939 |
| 2,779,608 | Abbey | Jan. 29, 1957 |
| 2,838,066 | Harris | June 10, 1958 |

FOREIGN PATENTS

| | | |
|---|---|---|
| 76,693 | Germany | of 1894 |